United States Patent
Helmy Mohamed et al.

(10) Patent No.: US 10,715,242 B1
(45) Date of Patent: Jul. 14, 2020

(54) GROUPING ANTENNA ELEMENTS TO ENHANCED AN ANTENNA ARRAY RESPONSE RESOLUTION

(71) Applicant: Facebook, Inc., Menlo Park, CA (US)

(72) Inventors: Ahmed Gamal Helmy Mohamed, Mountain View, CA (US); Krishna Srikanth Gomadam, San Jose, CA (US); Sam Padinjaremannil Alex, Dublin, CA (US); Walid Ali-Ahmad, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/582,858

(22) Filed: Sep. 25, 2019

(51) Int. Cl.
| | |
|---|---|
| *H04B 17/12* | (2015.01) |
| *H04B 7/0456* | (2017.01) |
| *H04B 7/06* | (2006.01) |
| *H01Q 1/52* | (2006.01) |
| *H01Q 3/38* | (2006.01) |

(52) U.S. Cl.
CPC ......... *H04B 7/0691* (2013.01); *H01Q 1/521* (2013.01); *H01Q 3/38* (2013.01); *H04B 17/12* (2015.01)

(58) Field of Classification Search
CPC .... H04B 7/0691; H04B 17/12; H04B 7/0478; H04B 7/0456; H04B 7/0634; H04B 1/712; H01Q 1/521; H01Q 3/38; H01Q 7/084

See application file for complete search history.

(56) References Cited

U.S. PATENT DOCUMENTS

| | | | |
|---|---|---|---|
| 5,414,433 A | 5/1995 | Chang et al. | |
| 6,084,545 A | 7/2000 | Lier et al. | |
| 6,252,542 B1 | 6/2001 | Sikina et al. | |
| 6,462,709 B1* | 10/2002 | Choi | H01Q 3/2605 342/378 |
| 6,771,216 B2 | 8/2004 | Patel et al. | |
| 6,816,116 B2 | 11/2004 | Chen | |
| 2009/0267824 A1* | 10/2009 | Cooper | H01Q 3/267 342/174 |
| 2011/0094288 A1* | 4/2011 | Medan | G10K 11/346 73/1.82 |
| 2013/0281159 A1* | 10/2013 | Ai | H01Q 3/40 455/562.1 |
| 2014/0313080 A1* | 10/2014 | Smith | H01Q 19/32 342/372 |

(Continued)

*Primary Examiner* — Andrew Wendell
(74) *Attorney, Agent, or Firm* — Brian R. Short

(57) ABSTRACT

Apparatuses, methods, and systems for grouping antenna elements to enhance an antenna array response resolution, are disclosed. One method includes selecting a plurality of groups of antenna elements from an antenna array, wherein each group includes a plurality of antenna elements of the antenna array, determining an optimal phase setting for a beam directed from each group to a target device, and characterizing each of the groups including adjusting a phase of an electronic signal passing through each of the antenna elements of the group based on the optimal phase setting of the group, adjusting an amplitude $a_i$ of the electronic signal the passing through each of the antenna elements of the group to compensate for a loss of antenna array gain of the antenna array due to grouping of the antenna elements, and storing the adjusted phase and adjusted amplitude for each of the antenna element.

20 Claims, 8 Drawing Sheets

(56) References Cited

U.S. PATENT DOCUMENTS

| | | | |
|---|---|---|---|
| 2016/0080051 A1* | 3/2016 | Sajadieh | H04B 7/0639 |
| | | | 375/267 |
| 2016/0218437 A1* | 7/2016 | Guntupalli | H01Q 15/08 |
| 2017/0142605 A1* | 5/2017 | Cheng | H04B 7/0617 |
| 2018/0115065 A1* | 4/2018 | Valdes Garcia | H04B 17/12 |
| 2019/0007119 A1* | 1/2019 | Su | H04B 7/0456 |
| 2019/0363760 A1* | 11/2019 | Wu | H04B 7/0456 |

* cited by examiner

4 X 2 Antenna Array
Operates as a 2 X 2 Antenna Array with
Improved Phase Resolution Due to Grouping 4 X 4 Antenna Array
Illustrating Various Types of
Antenna element Groupings Selecting a plurality of groups of antenna elements from an antenna array, wherein each group includes a plurality of antenna elements of the antenna array

810

Determining an optimal phase setting $\varphi_{opt}$ for a beam directed from each group to a target device

820

Characterizing each of the groups

830

Adjusting a phase $\varphi_i$ of an electronic signal passing through each of the antenna elements of the group based on the optimal phase setting $\varphi_{opt}$ of the group

840

Adjusting an amplitude $a_i$ of the electronic signal the passing through each of the antenna elements of the group to compensate for a loss of antenna array gain of the antenna array due to grouping of the antenna elements

850

Storing the adjusted phase and adjusted amplitude for each of the antenna element of each group

GROUPING ANTENNA ELEMENTS TO ENHANCED AN ANTENNA ARRAY RESPONSE RESOLUTION

FIELD OF THE DESCRIBED EMBODIMENTS

The described embodiments relate generally to wireless communications. More particularly, the described embodiments relate to systems, methods and apparatuses for grouping antenna elements to enhance an antenna array response resolution.

BACKGROUND

At least some multiple antenna systems operate to form beams for enhanced communication between wireless devices. Some wireless devices use low-resolution phase shifters for formation of the beams. However, low-resolution phase shifters can result in undesirable sidelobes in the antenna response.

It is desirable to have methods apparatuses, and systems for grouping antenna elements to enhance an antenna array response resolution.

SUMMARY

Another embodiment includes a method. The method includes selecting a plurality of groups of antenna elements from an antenna array, wherein each group includes a plurality of antenna elements of the antenna array, determining an optimal phase setting $\varphi_{opt}$ for a beam directed from each group to a target device, and characterizing each of the groups. For an embodiment, characterizing each of the groups includes adjusting a phase pi of an electronic signal passing through each of the antenna elements of the group based on the optimal phase setting $\varphi_{opt}$ of the group, adjusting an amplitude $a_i$ of the electronic signal the passing through each of the antenna elements of the group to compensate for a loss of antenna array gain of the antenna array due to grouping of the antenna elements, and storing the adjusted phase and adjusted amplitude for each of the antenna elements of each group.

An embodiment includes an apparatus. The apparatus includes an antenna array, a radio electrically connected to the antenna array, and a controller electrically connected to the radio. The controller operates to select a plurality of groups of antenna elements from the antenna array, wherein each group includes a plurality of antenna elements of the antenna array, determine an optimal phase setting $\varphi_{opt}$ for a beam directed from each group to a target device, and characterize each of the groups. For an embodiment, characterizing each of the groups includes adjusting a phase pi of an electronic signal passing through each of the antenna elements of the group based on the optimal phase setting $\varphi_{opt}$ of the group, and adjusting an amplitude $a_i$ of the electronic signal the passing through each of the antenna elements of the group to compensate for a loss of antenna array gain of the antenna array due to grouping of the antenna elements, wherein the controller is further operative to store the adjusted phase and adjusted amplitude for each of the antenna elements of each group.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 8 is a flow chart that include steps of a method of adjusting an amplitude and phase of an electronic signal passing through each antenna element of an array of antenna elements, according to an embodiment.

DETAILED DESCRIPTION

The embodiments described include methods, apparatuses, and systems for grouping antenna elements from an array of antenna elements. At least some embodiments include selecting a phase adjustment of an electronic signal propagating through each antenna element of each group of antenna elements to effectively increase the phase resolution of beams formed by the array of antenna elements. At least some embodiments further include adjusting an amplitude of an electronic signal propagating through each antenna element of each group of antenna elements to effectively improve an antenna array gain.

Figure 1:
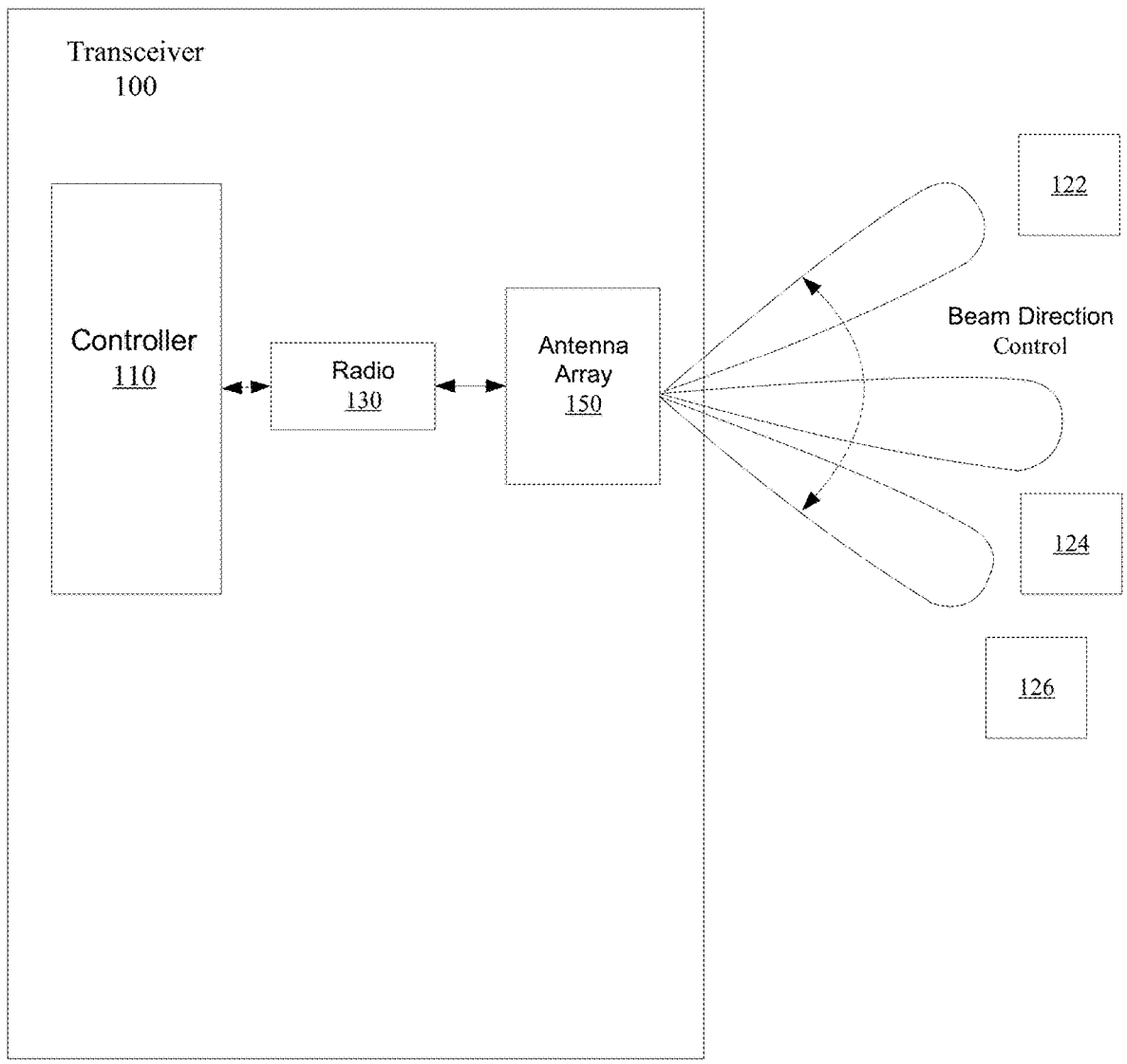
FIG. 1 shows a transceiver wirelessly communicating with a plurality of different devices, according to an embodiment.

FIG. 1 shows a transceiver 100 wirelessly communicating with a plurality of different devices 122, 124, 126, according to an embodiment. For an embodiment, the transceiver includes a controller 110, a radio 130, and an antenna array 150. The antenna array 150 is controllable to form a directional beam that allows the transceiver 100 to wirelessly communicate with the plurality of different devices 122, 124, 126. For an embodiment, a direction of the beam formed by the antenna array 150 is controlled by controlling a phase and/or amplitude of signals passing through each antenna element of the antenna array 150.

Figure 2:
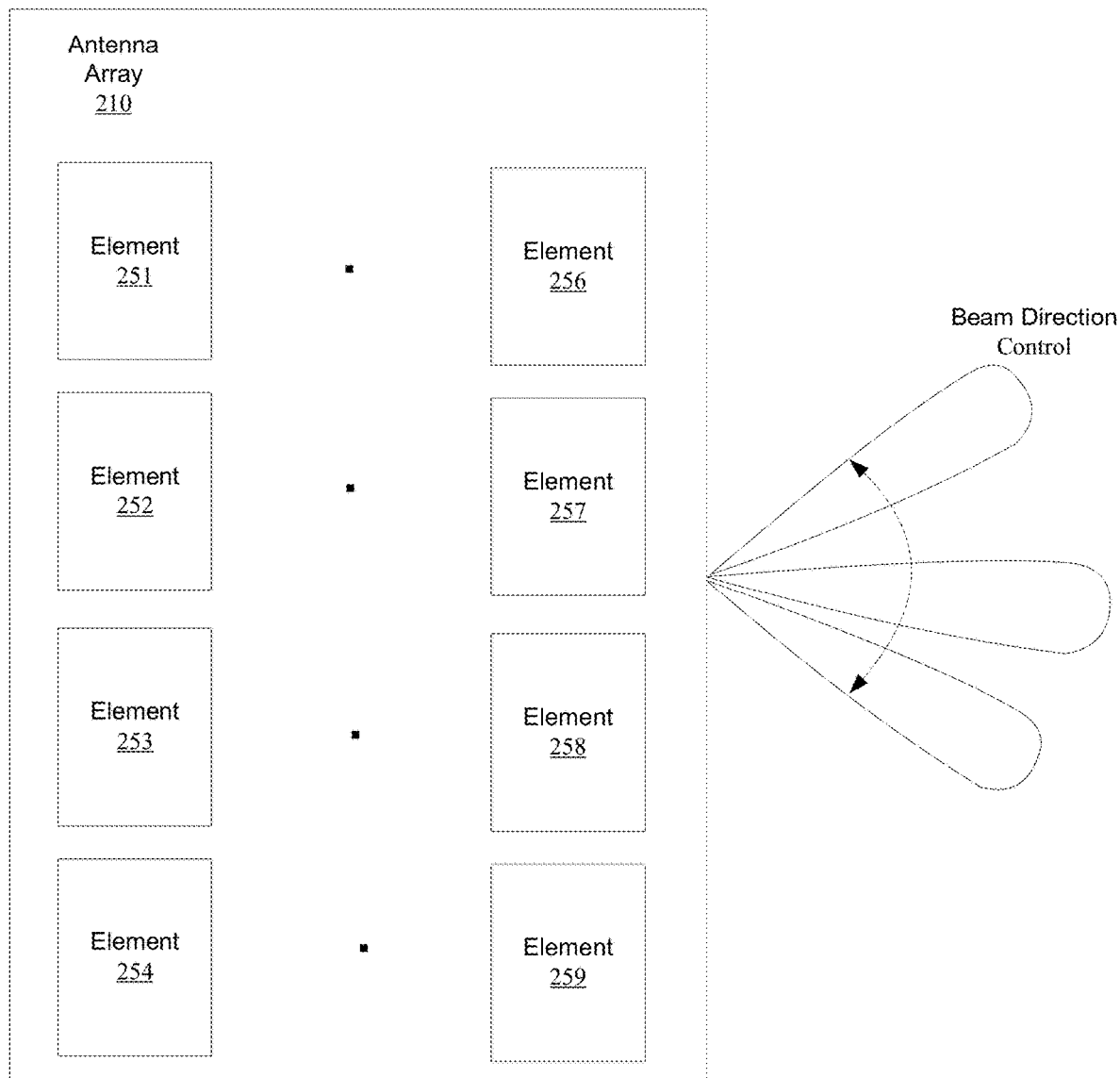
FIG. 2 shows an antenna array, according to an embodiment.

FIG. 2 shows an antenna array 210, according to an embodiment. For an embodiment, the antenna array 210 includes a plurality of antenna elements 251-259. For an embodiment, the antenna elements 251-259 of the antenna array 210 are organized into rows a columns. Further, as previously described, the antenna elements 251-259 of the antenna array 210 operates to form a beam based on phase and amplitude adjustments of signals being communicated through the antenna elements 251-259.

Figure 3:
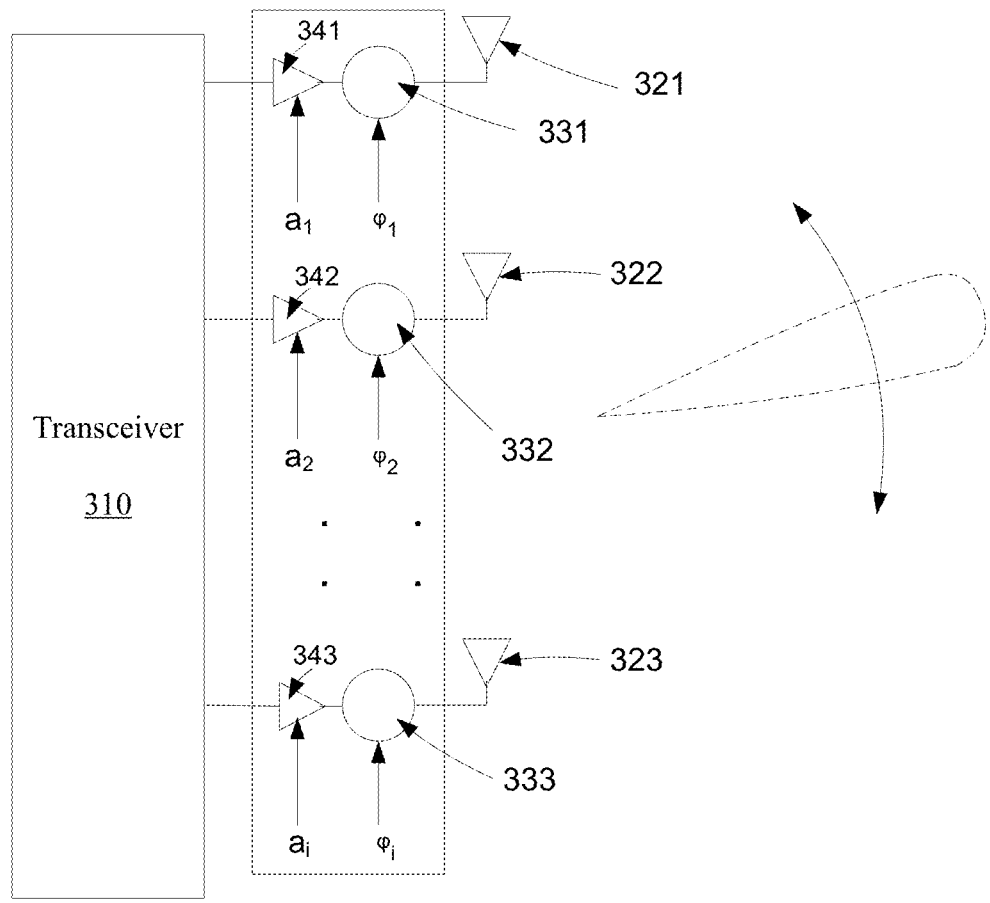
FIG. 3 shows an antenna array of antenna elements, wherein a direction of a beam formed by the antenna array is controlled by adjusting a phase and amplitude of electronic signals passing through the antenna elements of the antenna array, according to an embodiment.

FIG. 3 shows an antenna array of antenna elements, wherein a direction of a beam formed by the antenna array is controlled by adjusting a phase and amplitude of electronic signals passing through the antenna elements 321, 322, 323 of the antenna array, according to an embodiment. For an embodiment, the phase of the electronic signals are adjusted by phase shifters 331, 332, 333, and the amplitude of the electronic signals are adjusted by amplitude controllers 341, 342, 343.

For at least some embodiment, the phase shifters 331, 332, 333 are low-resolution phase shifters (for example, 2-bit phase shifters). However, the utilization of low-resolution phase shifters can result in undesirable side-lobes in the antenna response of the antenna array.

Figure 4:
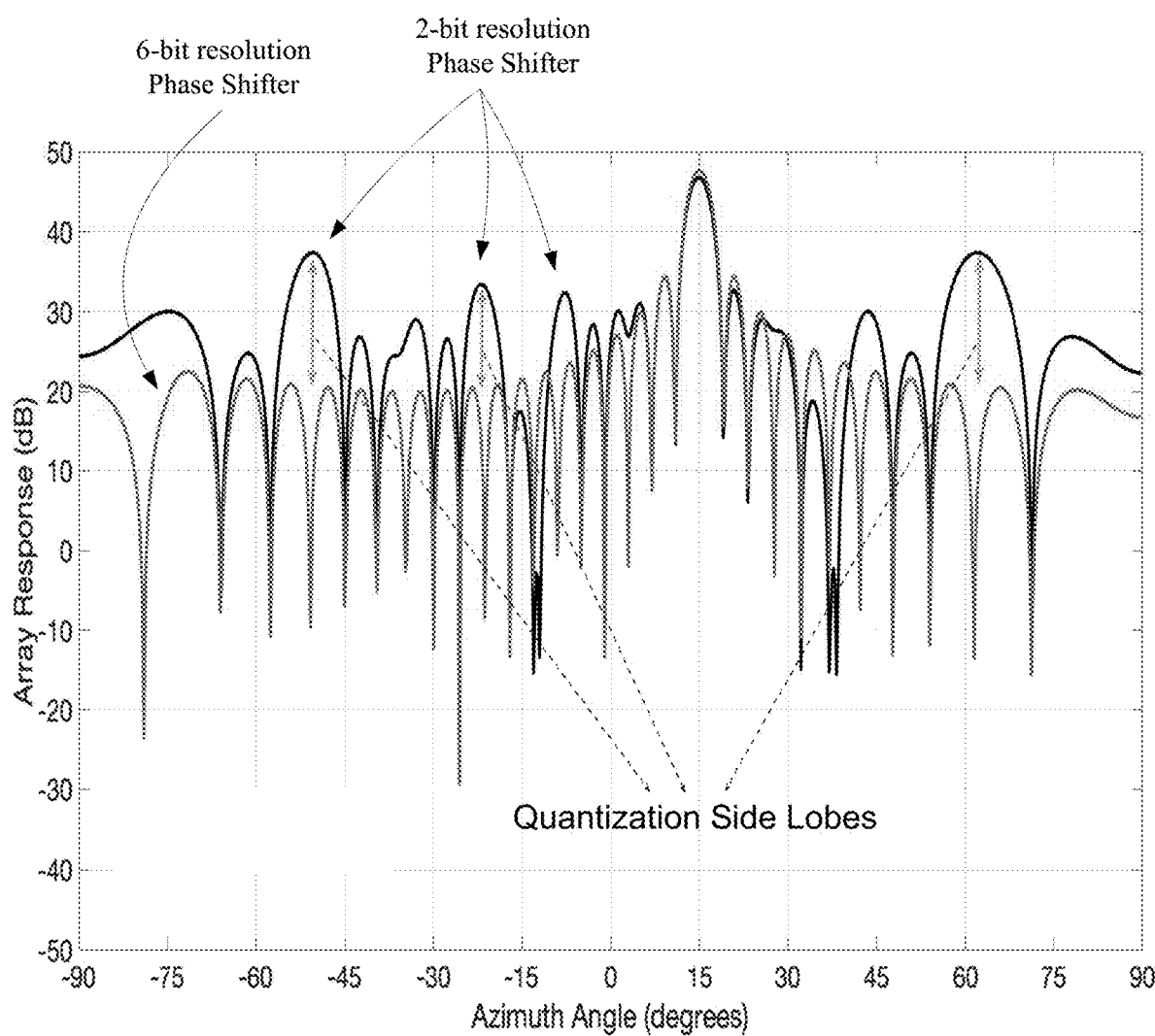
FIG. 4 is a plot of a frequency response of the beam formed by the antenna array of FIG. 3 that includes low-resolution phase shifters, according to an embodiment.

FIG. 4 is a plot of a frequency response of the beam formed by the antenna array of FIG. 3 that includes low-resolution phase shifters, according to an embodiment. As shown, when, for example, 2-bit phase shifters are used instead of 6-bit resolution phase shifters, side-lobes emerge due to quantization errors introduced by the lower-resolution phase shifters.

The side-lobes are detrimental to the performance of wireless communication using beams formed by the low-resolution phase shifters. Specifically, the side-lobes act as interference that affects other transmit and receive wireless links at a different scan angles (beam directions).

Mathematically, for an azimuth $\phi$ and elevation $\gamma$ from broadside (outward face of the antenna array), the antenna array response is:

$$A(\phi, \gamma) = \sum_{n=0}^{N-1} \sum_{m=0}^{M-1} a_{n,m} e^{-j\alpha_{n,m}} I_{n,m}(\phi, \gamma)$$

Wherein $\alpha_{n,m}$ is a steering angle, the antenna array has N×M antenna elements, $a_{n,m}$ represents a real-valued Amplitude Taper (amplitude or gain for each antenna element), and $I_{n,m}(\phi,\gamma)$ represents the Channel Response.

With digital phase shifters, the array response becomes:

$$\tilde{A}(\phi, \gamma) = \sum_{k=-\infty}^{\infty} \frac{(-1)^k}{(1-2\pi/\Delta^k)} \frac{\sin\Delta/2}{\Delta/2} \sum_{n=0}^{N-1} \sum_{m=0}^{M-1} a_{n,m} e^{-j(1+2\pi/\Delta^k)\alpha_{n,m}} I_{n,m}(\phi, \gamma)$$

Where the $2\pi/\Delta k$ components are due to quantization effects. Therefore, the maximum possible sidelobe level (SLL) suppression only depends on the resolution $\Delta$, wherein the SSL represents the level of sidelobes of the antenna response relative to the main lobe of the antenna response. That is, $$SLL = \frac{1}{2\pi/\Delta^{-1}}.$$

That is, mathematically it is shown that using low resolution phase shifters results in substantially worse sidelobe suppression than higher resolution phase shifters.

Figure 5:
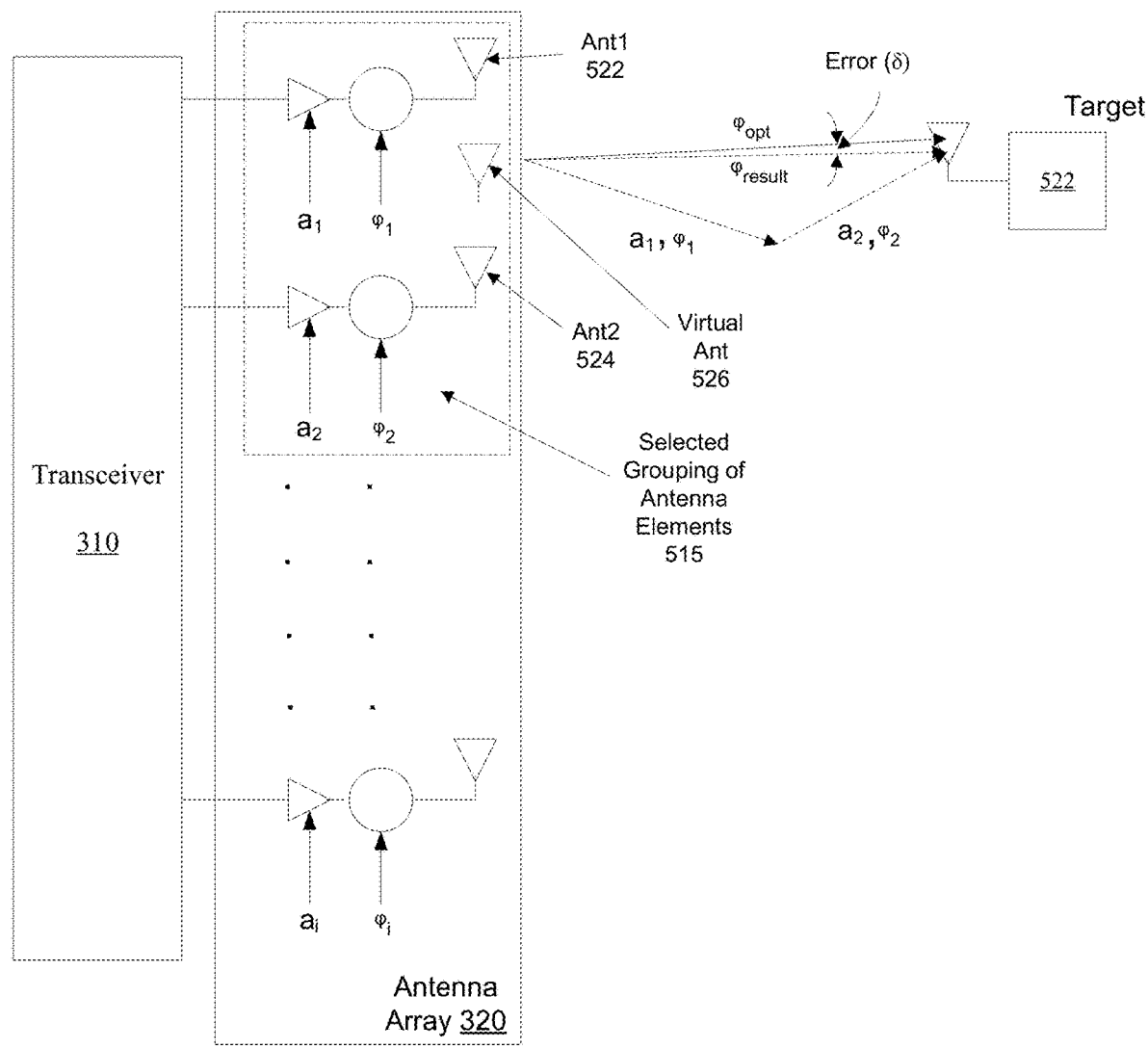
FIG. 5 shows an antenna array that includes grouping of antenna elements, and adjusting a phase and an amplitude of an electronic signal passing through each antenna element, according to an embodiment.

FIG. 5 shows an antenna array that includes grouping of antenna elements, and adjusting a phase and an amplitude of an electronic signal passing through each antenna element, according to an embodiment. For an embodiment, a controller of a transceiver 310 operates to select a plurality of groups of antenna elements from an antenna array 320. For an embodiment, each group includes a plurality of antenna elements of the antenna array. For example, FIG. 5 shows a grouping 515 of antennas of the antenna array 320 of a transceiver 310. The example grouping 515 includes two antenna elements.

For an embodiment, the controller of the transceiver 310 further operates to determine an optimal phase setting $\varphi_{opt}$ for a beam directed from each group to a target device (such as, target device 522). The optimal phase setting $\varphi_{opt}$ is a phase that would be selected to form a beam between the antenna array 550 at the selected group 515 of antenna elements to the target device 522 with an infinite resolution phase shifter.

As shown, the optimal phase $\varphi_{opt}$ is the phase that would optimally direct a beam from a virtual antenna (virtual antenna 526) to an antenna of the target 522. For an embodiment, the virtual antenna 526 is located between the antennas (Ant1 522, Ant2 524) of the selected group of antenna elements 515. For an embodiment, the virtual antenna is located halfway between the two selected antennas (Ant1 522, Ant2 524).

The optimal phase setting $\varphi_{opt}$ for a beam directed from each group to a target device can be determined as follows assuming and using an infinite phase shifter resolution:

$$A(\phi, \gamma) = \sum_{n=0}^{N-1} \sum_{m=0}^{M-1} e^{j(n2\pi/\lambda d_x \sin\phi\cos\gamma + m2\pi/\lambda d_y \sin\phi\sin\gamma - \alpha_{n,m})} e^{j\epsilon_{n,m}}$$

where
N Number of antenna elements in the azimuth direction
M Number of antenna elements in the elevation direction
$\lambda$ Wave Length
$d_x$ Antenna separation in the azimuth direction (x-axis)
$d_y$ Antenna separation in the elevation direction (y-axis)
$\alpha_{n,m}$ Progressive steering angle with infinite resolution for the ($n^{th}$, $m^{th}$) antenna element, where $\alpha_{n,m} = n2\pi/\lambda d_x \sin\phi_o \cos\gamma_o + m2\pi/\lambda d_y \sin\phi_o \sin\gamma_o$ $a_{n,m}$ Amplitude Taper (gain) with infinite resolution for the ($n^{th}$, $m^{th}$) antenna element
$\phi_0$ Azimuth Scan angle
$\gamma_o$ Elevation Scan angle
$\in_{n,m}$ Feedline delay for the ($n^{th}$, $m^{th}$) antenna element, and is uniformly distributed random phase modeling the feedline time delay, i.e. $\in_{n,m} \sim U[0, 2\pi]$ However, an infinite resolution phase shifter is not available. Further, certain implementations require low-resolution phase shifters (such as, a 2-bit resolution phase shifter). For an embodiment, an effective higher resolution beam can be realized by strategically selecting the phases $\varphi_1$, $\varphi_2$, of each of the antenna elements. For an embodiment, this includes selecting the phases of $\varphi_1$, $\varphi_2$ to yield an effectively higher resolution phase shifter.

At least some embodiments include characterizing each of the groups of antenna elements of the antenna array. For an embodiment, this includes adjusting a phase $\varphi_i$ of an electronic signal passing through each of the antenna elements of the group based on the optimal phase setting $\varphi_{opt}$ of the group. That is, the phase associated with each of the antenna elements of the group is selectively adjusted to yield an effective (over-the-air) resolution in an attempt to obtain the $\varphi_{opt}$.

At least some embodiments further include adjusting an amplitude $a_i$ of the electronic signal the passing through each of the antenna elements of the group to compensate for a loss of antenna array gain of the antenna array due to grouping of the antenna elements. That is, by grouping the antenna elements to effectively increase the phase resolution, the effective amplitude resolution is equivalently decreased. For example, by grouping the antenna elements into groups of two antenna elements, the amplitude resolution is decreased by a factor of two, and the antenna array gain is decreased by 3 dB.

As shown in FIG. 5, the selections of the phases $\varphi_1$, $\varphi_2$ and the amplitudes $a_1$, $a_2$ associated with the antennas (Ant1 522, Ant2 524) yields a beam having a resulting direction of $\varphi_{rest}$. An embodiment includes searching possible values of the phases $\varphi_1$, $\varphi_2$ and the amplitudes $a_1$, $a_2$ that yield a resulting beam in which the phase (direction) of the resulting beam is as close to the optimal beam direction ($\varphi_{opt}$) as possible, or within a threshold amount.

As previously stated, the resolution of the phase adjustors (phases $\varphi_1$, $\varphi_2$) are limited to, for example, 2-bits of resolution. Therefore, the search space available (that is, the values of the phases $\varphi_1$, $\varphi_2$ and the amplitudes $a_1$, $a_2$) is limited. That is, low-resolution phase shifters have fewer possible values, and therefore, a more limited search space. That is, an embodiment includes searching all possible phases $\varphi_1$, $\varphi_2$ and the amplitudes $a_1$, $a_2$ of each of the antenna elements of the selected group based on the value of optimal beam direction $\varphi_{opt}$, in an attempt to minimize an error between the resulting phase and the optimal phase, or to make the error between the resulting phase and the optimal phase less than a predetermined threshold. The predetermined threshold can be determined based on the application in which the level of acceptable sidelobes levels is satisfied.

As stated, for an embodiment, the phases $\varphi_1$, $\varphi_2$ and the amplitudes $a_1$, $a_2$ associated with each of the antenna elements of the selected group of antenna elements are selected based on the value of $\varphi_{opt}$. For an embodiment, the values of the phases $\varphi_1$, $\varphi_2$ and the amplitudes $a_1$, $a_2$ associated with each of the antenna elements are selected to maintain an error ($\delta$) between the resulting $\varphi_{result}$ phase and the optimal phase $\varphi_{opt}$ that is less than a preselected amount. For an embodiment, the values of the phases $\varphi_1$, $\varphi_2$ and the amplitudes $a_i$, $a_2$ associated with each of the antenna elements are selected to maintain an error ($\delta$) between the resulting $\varphi_{result}$ phase and the optimal phase $\varphi_{opt}$ that is minimized. For an embodiment, the error includes a squared error. For an embodiment, the error is minimized. For an embodiment, the error is selected to be less than a desired threshold amount. Generally, the lower the error, the greater the suppression of the sidelobes. The desired threshold amount can be determined based on the level of sidelobes that are acceptable for an application.

For an embodiment, the phases and amplitudes (a1, a2, alpha1 (also represented here $\varphi_{1,}$), alpha2 (also represented here as ($\varphi_2$) are obtained to equivalently construct a resulting vector $\chi_{n,m} e^{-j\psi_{n,m}}$ whose phase $\psi_{n,m}$ is as close as possible to the optimum phase $\alpha_{n,m}$ by reducing the error (for example, squared error) between them while adjusting the amplitude of the resulting vector $\chi_{n,m}$ to compensate for the mainlobe gain loss due to the antenna grouping.

$\tilde{A}(\phi, \gamma) =$ $\left(\frac{\sin\Delta/2}{\Delta/2}\right)^{-1}\left[\sum_{n=0}^{N-1}\sum_{m=0}^{M-1} a_{n,m}^{(1)} e^{-j\alpha_{n,m}^{(1)}} e^{j(n2\pi/\lambda d_x \sin\phi\cos\gamma + m2\pi/\lambda d_y \sin\phi\sin\gamma)} e^{j\epsilon_{n,m}} +\right.$ -continued $\left.\sum_{n=0}^{N-1}\sum_{m=0}^{M-1} a_{n,m}^{(2)} e^{-j\alpha_{n,m}^{(2)}} e^{j(n2\pi/\lambda d_x \sin\phi\cos\gamma + m2\pi/\lambda d_y \sin\phi\sin\gamma)} e^{j\epsilon_{n,m}}\right] =$ $\left(\frac{\sin\Delta/2}{\Delta/2}\right)^{-1}\sum_{n=0}^{N-1}\sum_{m\,even}^{M-1} \chi_{n,m} e^{-j\psi_{n,m}} e^{j(n2\pi/\lambda d_x \sin\phi\cos\gamma + m2\pi/\lambda d_y \sin\phi\sin\gamma)}$ $e^{j\epsilon_{n,m}}\{a_{n,m}^{(1)}, a_{n,m}^{(2)}, \overline{\alpha}_{n,m}^{(1)}, \overline{\alpha}_{n,m}^{(2)}\} = \text{maximize } \chi_{n,m}$ $|\alpha_{n,m} - \psi_{n,m}|^2 \leq \delta$ wherein $\delta$ is the error between the optimal phase $\alpha_{n,m}$ (also depict here as $\varphi_{opt}$) and the resulting phase $\psi_{n,m}$ (also depicted here as $\varphi_{result}$).

Once the phase and amplitude adjustments have been selected for the target device, the adjusted phase and adjusted amplitude for each of the antenna element of each group are stored for future reference. That is, in the future (after calibration) when the wireless communication device desired to communicate with the target device, the wireless communication device retrieves the adjusted phase and amplitude settings for each of the antenna elements of each of the groups of antenna elements.

Figure 6:
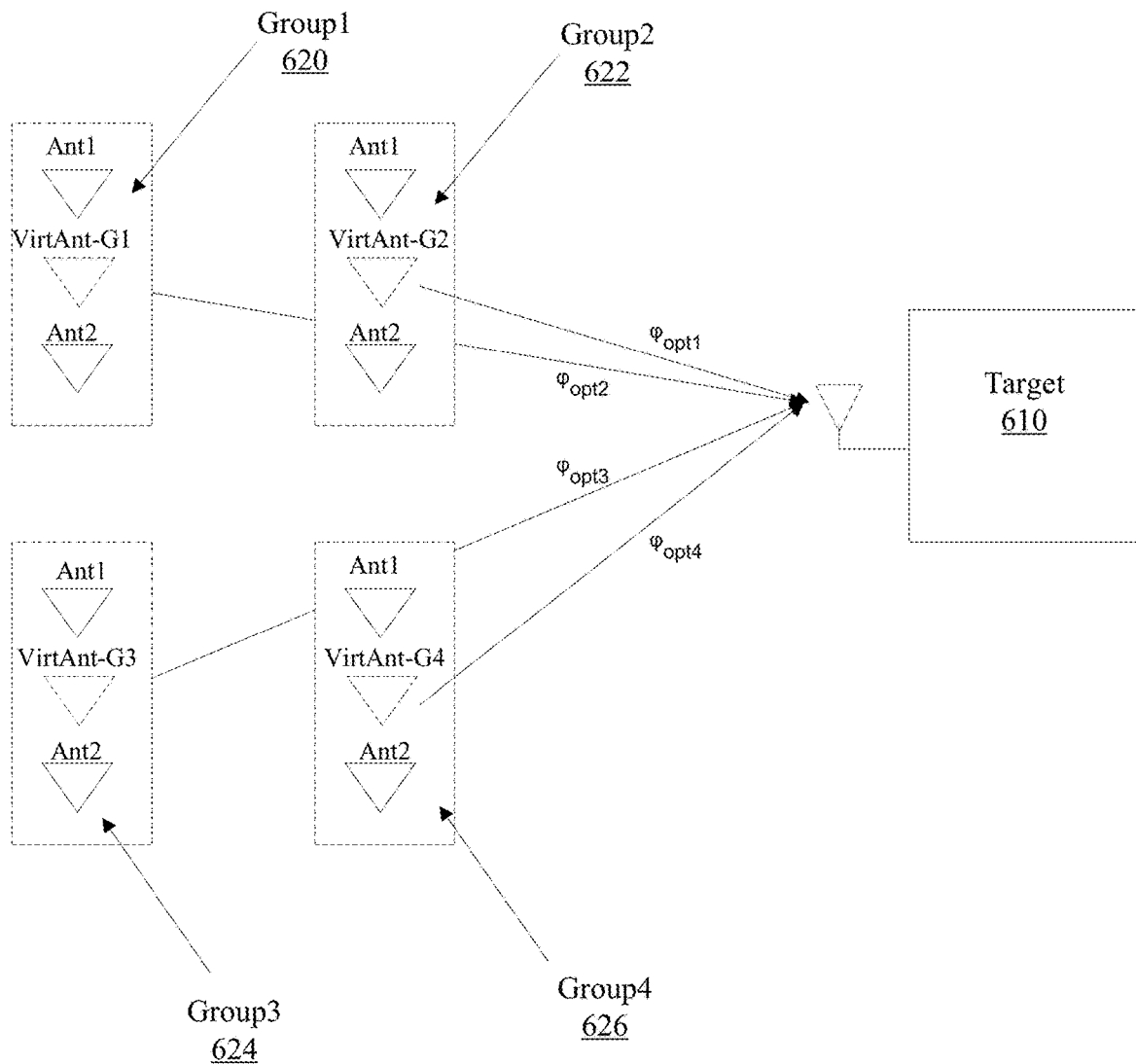
FIG. 6 shows an antenna array that include multiple groups of antenna elements, wherein an optimal beam direction to a target exists for each of the groups of antenna elements, according to an embodiment.

FIG. 6 shows an antenna array that include multiple groups of antenna elements, wherein an optimal beam direction to a target exists for each of the groups of antenna elements, according to an embodiment. As shown, groups (Group1 620, Group2 622, Group3 624, Group4 626) of antenna elements are selected from an array that includes 4×4 antenna elements. As shown in FIG. 6, each group (Group1 620, Group2 622, Group3 624, Group4 626) includes two antenna elements (Ant1, Ant2). Further, as shown, a virtual antenna elements (VirtAnt-G1, VirtAnt-G2, VirtAnt-G3, VirtAnt-G4) is virtually located at a location within each group between the two antenna elements (Ant1, Ant2) of each of the groups (Group1 620, Group2 622, Group3 624, Group4 626).

Once the groups (Group1 620, Group2 622, Group3 624, Group4 626) of the antenna array have been selected, the an optimal phase $\varphi_{opt}$ for a beam directed between each of the virtual antenna elements (VirtAnt-G1, VirtAnt-G2, VirtAnt-G3, VirtAnt-G4) and the target 610 are determined. Next, a phase p and an amplitude of signals passing through each of the antenna elements (Ant1, Ant2) of each of the groups (Group1 620, Group2 622, Group3 624, Group4 626) are selected. As previously described, the a phase $\varphi$ and an amplitude of each of the antenna elements of each of the groups is selected to yield a resulting beam that has a resulting phase $\varphi_{result}$ that is different (error ($\delta$)) than $\varphi_{opt}$ by a threshold amount, or in which the error ($\delta$) in minimized. As shown, each of the groups (Group1 620, Group2 622, Group3 624, Group4 626) has its own optimal phase $\varphi_{opt1}$, $\varphi_{opt2}$, $\varphi_{opt3}$, $\varphi_{opt4}$, and the phases and amplitudes associated with each of the antenna elements of each of the groups are selected accordingly.

By horizontally grouping the antenna elements into groups of two antenna elements, a 4×2 element antenna array essentially becomes a 2×2 antenna array, but the effective phase resolution of the 2×2 array is better than the phase resolution of the 4×2 antenna array.

Figure 7:
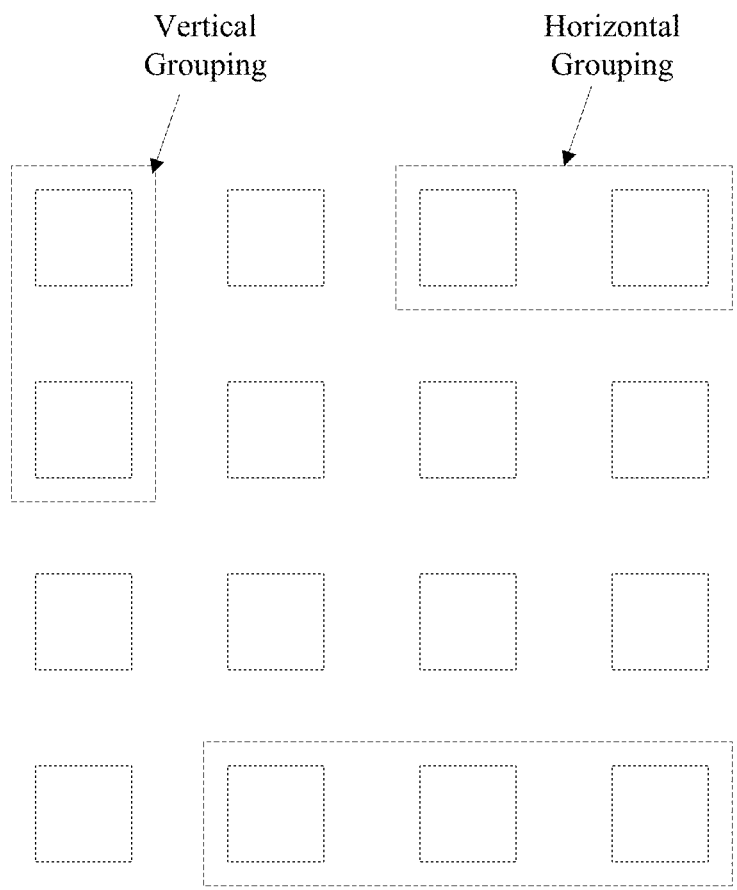
FIG. 7 shows an antenna array and a selected groups of antenna elements, according to an embodiment.

FIG. 7 shows an antenna array and a selected groups of antenna elements, according to an embodiment. As shown, for an embodiment, two antenna elements are vertically selected to form a vertical group 710 of antenna elements. As shown, for an embodiment, two antenna elements are horizontally selected to form a horizontal group 720 of antenna elements. Further, another grouping 730 includes more than two antenna elements.

For an embodiment, the vertical group 710 of antenna elements is selected if the wireless system is more tolerant to a wider beam in an elevation domain. That is, lower vertical resolution results when vertically grouping the antenna elements. Therefore, the beam formed by the antenna elements is wider in the elevation domain.

For an embodiment, the horizontal group 720 of antenna elements is selected if the wireless system is more tolerant to a wider beam in an azimuth domain. That is, lower horizontal resolution results when horizontally grouping the antenna elements. Therefore, the beam formed by the antenna elements is wider in the azimuth domain.

For an embodiment, more antenna elements are selected within a group for increased phase resolution of the beams formed by the antenna array.

For an embodiment, non-adjacent antenna elements are selected.

FIG. 8 is a flow chart that include steps of a method of adjusting an amplitude and phase of an electronic signal passing through each antenna element of an array of antenna elements, according to an embodiment. A first step 810 includes selecting a plurality of groups of antenna elements from an antenna array, wherein each group includes a plurality of antenna elements of the antenna array. A second step 820 includes determining an optimal phase setting $\varphi_{opt}$ for a beam directed from each group to a target device. A third step 830 includes characterizing each of the groups. For an embodiment, characterizing each of the groups includes a fourth step 840 that includes adjusting a phase $\varphi_i$ of an electronic signal passing through each of the antenna elements of the group based on the optimal phase setting $\varphi_{opt}$ of the group, and a fifth step 850 includes adjusting an amplitude $a_i$ of the electronic signal the passing through each of the antenna elements of the group to compensate for a loss of antenna array gain of the antenna array due to grouping of the antenna elements. A sixth step 860 includes storing the adjusted phase and adjusted amplitude for each of the antenna element of each group.

As previously described, once the phase and amplitude selections (adjusted phase and adjusted amplitude) have been determined, they are stored and can be retrieved. For example, for a transceiver includes the antenna array, the stored adjusted phase and adjusted amplitude are retrieved from memory for each of the antenna elements for each group when wirelessly communicating with the target device.

Further, for a plurality of target, at least some embodiments further include characterizing each of the groups for each of the plurality of targets, and storing the adjusted phase and adjusted amplitude for each of the antenna element of each group for each of the plurality of targets. Accordingly, the phase and amplitude setting can be retrieved for communicating with each of the plurality of targets.

For at least some embodiments, adjusting the phase pi of the electronic signal passing through each of the antenna elements of the group based on the optimal phase setting $\varphi_{opt}$ of the group comprises minimizing an error (squared error) of an equivalently-generated phase resulting from a combination of the adjusted phases of each of the antenna element with respect to the optimal phase setting $\varphi_{opt}$.

For at least some embodiments, adjusting the amplitude $a_i$ of the electronic signal the passing through each of the antenna elements of the group to compensate for the loss of antenna array gain of the antenna array due to the grouping of the antenna elements comprises adjusting a gain of each antenna element with the corresponding adjusted phase to increase the antenna array gain.

As stated, for an embodiment, the phases $\varphi_1$, $\varphi_2$ and the amplitudes $a_1$, $a_2$ associated with each of the antenna elements of the selected group of antenna elements are selected based on the value of $\varphi_{opt}$. For an embodiment, the values of the phases $\varphi_1$, $\varphi_2$ and the amplitudes $a_1$, $a_2$ associated with each of the antenna elements are selected to maintain an error ($\delta$) between the resulting $\varphi_{result}$ phase and the optimal phase $\varphi_{opt}$ that is less than a preselected amount. For an embodiment, the preselected amount is determine based on the sidelobe levels of the antenna response that is acceptable for the application in which the antenna array is being utilized. For an embodiment, the values of the phases $\varphi_1$, $\varphi_2$ and the amplitudes $a_1$, $a_2$ associated with each of the antenna elements are selected to maintain an error ($\delta$) between the resulting $\varphi_{result}$ phase and the optimal phase $\varphi_{opt}$ that is minimized.

For at least some embodiments, each group includes two adjacent antenna elements. For at least some embodiments, the adjacent antenna elements are horizontally adjacent. For an embodiment, the vertical group of antenna elements is selected if the wireless system is more tolerant to a wider beam in an elevation domain.

For at least some embodiments, the adjacent antenna elements are vertically adjacent. For an embodiment, the horizontal group of antenna elements is selected if the wireless system is more tolerant to a wider beam in an azimuth domain.

However, for at least some embodiments, each group include two non-adjacent antenna elements. Further, for at least some embodiments, one or more of the groups include more than two antenna elements.

Although specific embodiments have been described and illustrated, the embodiments are not to be limited to the specific forms or arrangements of parts so described and illustrated. The described embodiments are to only be limited by the claims.

What is claimed:

1. A method comprising:
   selecting a plurality of groups of antenna elements from an antenna array, wherein each group includes a plurality of antenna elements of the antenna array;
   determining an optimal phase setting $\varphi_{opt}$ for a beam directed from each group to a target device;
   characterizing each of the groups, comprising:
   adjusting a phase $\varphi_i$ of an electronic signal passing through each of the antenna elements of the group based on the optimal phase setting $\varphi_{opt}$ of the group, wherein the adjusting reduces an error of an equivalently-generated phase resulting from a combination of the adjusted phases of each of the antenna element with respect to the optimal phase setting $\varphi_{opt}$;
   adjusting an amplitude $a_i$ of the electronic signal the passing through each of the antenna elements of the group to compensate for a loss of antenna array gain of the antenna array due to grouping of the antenna elements; and
   storing the adjusted phase and adjusted amplitude for each of the antenna element of each group.

2. The method of claim 1, wherein a transceiver includes the antenna array, and further comprising retrieving the stored adjusted phase and adjusted amplitude for each of the antenna elements for each group when the transceiver is wirelessly communicating with the target device.

3. The method of claim 2, further comprising:
   characterizing each of the groups for a plurality of targets;

storing the adjusted phase and adjusted amplitude for each of the antenna element of each group for each of the plurality of targets.

4. The method of claim 1, wherein the adjusting the phase $\varphi_i$ of the electronic signal passing through each of the antenna elements of the group based on the optimal phase setting $\varphi_{opt}$ of the group comprises minimizing an error (squared error) of the equivalently-generated phase resulting from the combination of the adjusted phases of each of the antenna element with respect to the optimal phase setting $\varphi_{opt}$.

5. The method of claim 1, wherein adjusting the amplitude $a_i$ of the electronic signal the passing through each of the antenna elements of the group to compensate for the loss of antenna array gain of the antenna array due to the grouping of the antenna elements comprises adjusting a gain of each antenna element with the corresponding adjusted phase to increase the antenna array gain.

6. The method of claim 1, wherein the adjusting the phase $\varphi_i$ of the electronic signal passing through each of the antenna elements of the group based on the optimal phase setting $\varphi_{opt}$ of the group comprises maintaining the error of the equivalently-generated phase resulting from the combination of the adjusted phases of each of the antenna element with respect to the optimal phase setting $\varphi_{opt}$ below a threshold.

7. The method of claim 1, wherein each group includes two adjacent antenna elements, and wherein the adjacent antenna elements are horizontally adjacent.

8. The method of claim 1, wherein each group includes two adjacent antenna elements, and wherein the adjacent antenna elements are vertically adjacent.

9. The method of claim 1, wherein each group include two non-adjacent antenna elements.

10. The method of claim 1, wherein one or more of the groups include more than two antenna elements.

11. A apparatus comprising:
an antenna array;
a radio electrically connected to the antenna array;
a controller electrically connected to the radio, the controller operative to:
select a plurality of groups of antenna elements from the antenna array, wherein each group includes a plurality of antenna elements of the antenna array;
determine an optimal phase setting $\varphi_{opt}$ for a beam directed from each group to a target device;
characterize each of the groups, comprising:
adjusting a phase $\varphi_i$ of an electronic signal passing through each of the antenna elements of the group based on the optimal phase setting $\varphi_{opt}$ of the group, wherein the adjusting reduces an error of an equivalently-generated phase resulting from a combination of the adjusted phases of each of the antenna element with respect to the optimal phase setting $\varphi_{opt}$;
adjusting an amplitude $a_i$ of the electronic signal the passing through each of the antenna elements of the group to compensate for a loss of antenna array gain of the antenna array due to grouping of the antenna elements;
wherein the controller is further operative to:
store the adjusted phase and adjusted amplitude for each of the antenna element of each group.

12. The apparatus of claim 11, wherein the controller further operates to retrieve the stored adjusted phase and adjusted amplitude for each of the antenna elements for each group when wirelessly communicating with the target device.

13. The apparatus of claim 12, wherein the controller further operates to:
characterize each of the groups for a plurality of targets;
store the adjusted phase and adjusted amplitude for each of the antenna element of each group for each of the plurality of targets.

14. The apparatus of claim 11, wherein the controller operating to adjust the phase $\varphi_i$ of the electronic signal passing through each of the antenna elements of the group based on the optimal phase setting $\varphi_{opt}$ of the group includes the controller operating to minimize an error (squared error) of the equivalently-generated phase resulting from the combination of the adjusted phases of each of the antenna element with respect to the optimal phase setting $\varphi_{opt}$.

15. The apparatus of claim 11, wherein the controller operating to the amplitude $a_i$ of the electronic signal the passing through each of the antenna elements of the group to compensate for the loss of antenna array gain of the antenna array due to the grouping of the antenna elements includes the controller operating to adjust a gain of each antenna element with the corresponding adjusted phase to increase the antenna array gain.

16. The apparatus of claim 11, wherein the controller operating to adjust the phase $\varphi_i$ of the electronic signal passing through each of the antenna elements of the group based on the optimal phase setting $\varphi_{opt}$ of the group includes the controller operating to maintain the error of the equivalently-generated phase resulting from the combination of the adjusted phases of each of the antenna element with respect to the optimal phase setting $\varphi_{opt}$ below a threshold.

17. The apparatus of claim 11, wherein each group includes two adjacent antenna elements, and wherein the adjacent antenna elements are horizontally adjacent.

18. The apparatus of claim 11, wherein each group includes two adjacent antenna elements, and wherein the adjacent antenna elements are vertically adjacent.

19. The apparatus of claim 11, wherein each group include two non-adjacent antenna elements.

20. The apparatus of claim 11, wherein one or more of the groups include more than two antenna elements.

* * * * *